Feb. 6, 1934. A. S. DIACK 1,946,016

MOTOR VEHICLE DRIVE MECHANISM

Filed March 7, 1932   2 Sheets-Sheet 1

INVENTOR
Alexander S. Diack

BY *[signature]*

ATTORNEYS

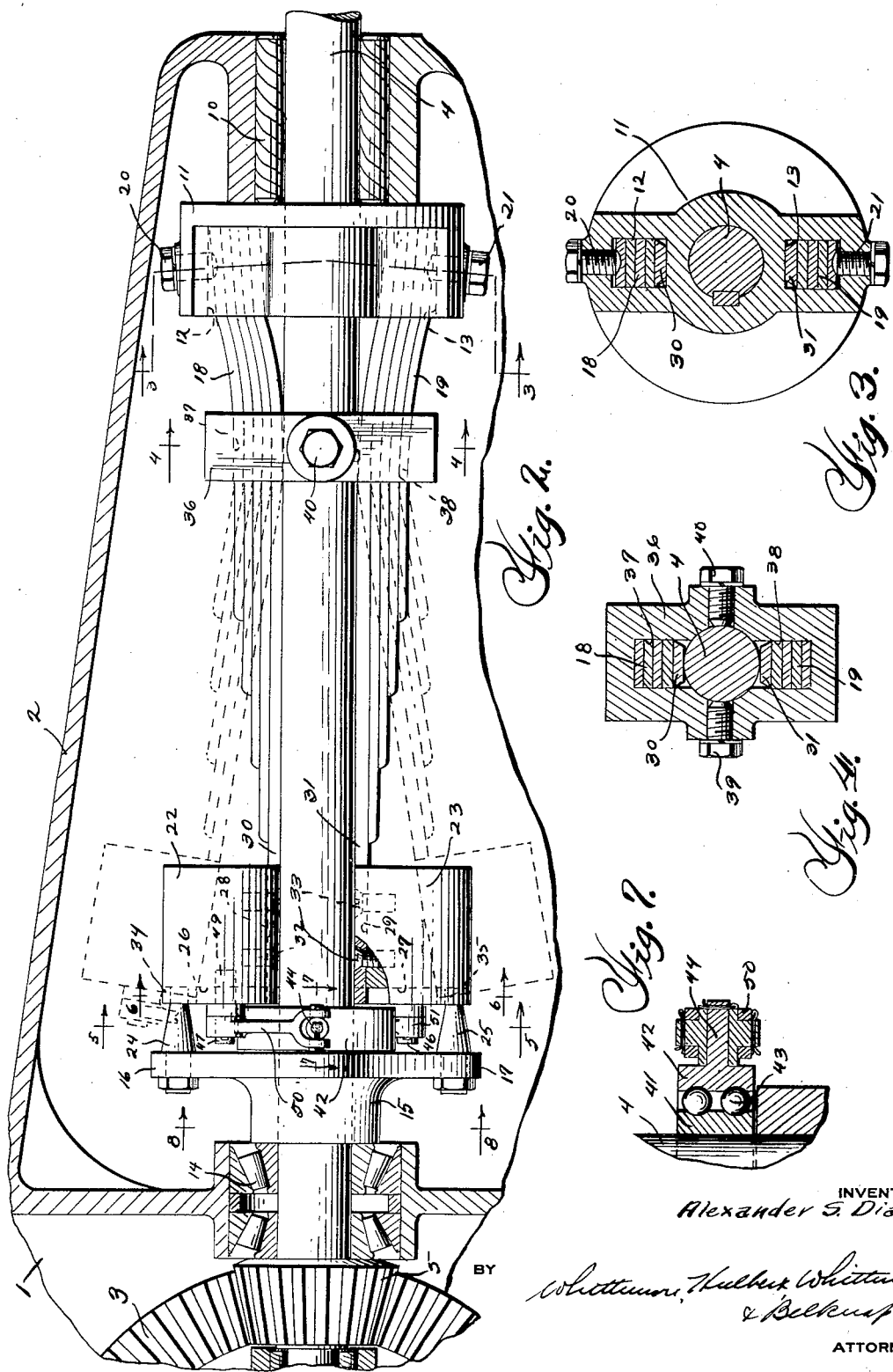

Patented Feb. 6, 1934

1,946,016

UNITED STATES PATENT OFFICE 1,946,016

MOTOR VEHICLE DRIVE MECHANISM

Alexander S. Diack, Detroit, Mich.

Application March 7, 1932. Serial No. 597,387

9 Claims. (Cl. 74—6)

This invention relates generally to motor vehicles and refers more particularly to the driving mechanism thereof.

Heretofore the transmission of power impulses from the pistons of the vehicle motor through the conventional train of metallic contacts, i. e., rods, gears, propeller shaft, pinions and ring gear, to and through the vehicle tires engaging the road has been very unsatisfactory and inefficient. For example, it has been practically impossible due to (1) the almost instantaneous delivery to the tires of the power impulses on the pistons, (2) the unstable nature of the tires, and (3) the inertia to be overcome, to obtain the efficient application of all of the energy. In use the tires, under stress, act and react like bubbles and the effect of the power impulses is to put that part of the tire posterior to the road contact in tension, and to crowd or put under compression the anterior portion thereof. Actually this deformation of the tire is not steady but is registered with each power impulse. Between impulses the recoil or attempted recovery of the tire produces a wavering or twitching action which, in turn, is communicated to the ring gear and registers in a repercussion on the teeth of the gear. Consequently the factor of time in the delivery of energy or power impulses from the pistons to the tires is important. In fact, by introducing the factor of time in the delivery to the tires of the motor impulses I have found that the shunting of a portion of the energy of the propeller shaft, heretofore lost in the wavering or twitching of the tires, by means of mechanism designed to absorb and store said portion and to return it between impulses, obviates the difficulties heretofore experienced. In other words I have conceived a structure which checks the thrust to the tires and makes the forces imparted thereto more constant.

In the accompanying drawings:

Figure 2 is an enlarged vertical sectional view through a portion of the differential housing and showing the mechanism embodying my invention applied to the propeller shaft;

Figure 3 is a sectional view taken on the line 3—3 of Figure 2;

Figure 4 is a sectional view taken on the line 4—4 of Figure 2;

Figure 7 is a sectional view taken on the line 7—7 of Figure 2;

Figure 1:
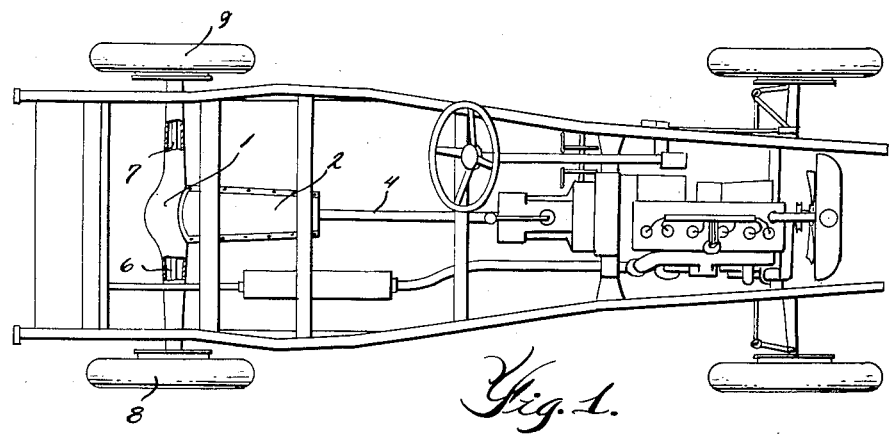
Figure 1 is a top plan view of a motor vehicle with a drive mechanism embodying my invention.
Figure 8:
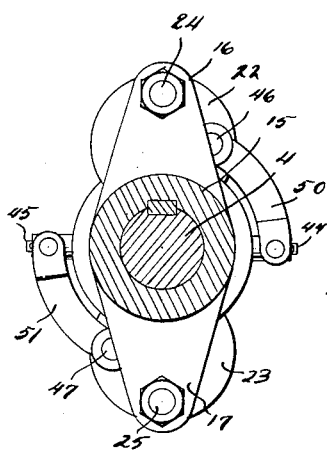
Figure 8 is a sectional view taken on the line 8—8 of Figure 2.
Figure 5:
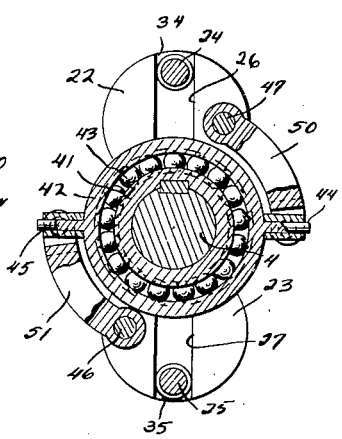
Figure 5 is a sectional view taken on the line 5—5 of Figure 2.
Figure 6:
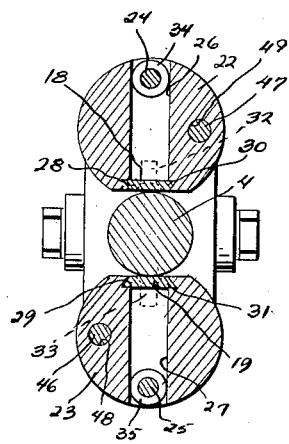
Figure 6 is a sectional view taken on the line 6—6 of Figure 2.
Figure 9:
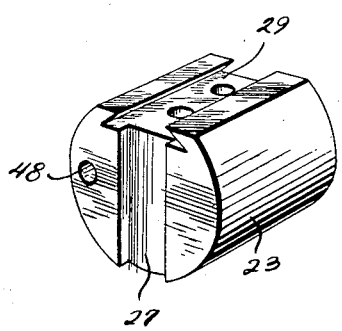
Figure 9 is a detail perspective view of one of the weights.

Referring now to the drawings, 1 is a differential housing having an elongated forward extension 2; 3 is a ring gear in the housing 1; 4 is a propeller shaft journaled in the housing 1 and extension 2; and 5 is a beveled gear or pinion carried by the shaft 4 and meshing with the ring gear 3. Insofar as my invention is concerned the forward end of the propeller shaft 4 may be connected by the usual universal (not shown) to the crank shaft of the motor, while the ring gear 3 may be connected in the usual manner to the rear axle sections 6 and 7 respectively to which the wheels 8 and 9 are connected.

Keyed to the shaft 4 adjacent the bearing 10 in the extension 2 is a casting 11 provided at diametrically opposite sides of the shaft with rearwardly opening sockets or recesses 12 and 13 respectively, while keyed to the shaft 4 adjacent the bearing 14 in the housing 1 is another casting 15 provided at diametrically opposite sides of the shaft with radially extending arms 16 and 17 respectively. Extending longitudinally of the shaft 4 at diametrically opposite sides thereof are leaf springs 18 and 19 respectively having their forward ends received in the sockets 12 and 13 and held by set screws or bolts 20 and 21, and having their rear ends adjacent the casting 15 and free relative to the shaft 4. 22 and 23 respectively are weights upon the outer sides of and rigid with the springs 18 and 19 at the rear ends thereof, and 24 and 25 respectively are pins projecting forwardly from the arms 16 and 17 respectively and received within slots 26 and 27 respectively extending transversely of the rear ends of the weights 22 and 23. Preferably the weights 22 and 23 have longitudinally extending slots 28 and 29 respectively that receive the innermost plies 30 and 31 respectively of the springs and are secured thereto by screws or bolts 32 and 33, while rollers 34 and 35 respectively are mounted on the forward ends of the pins 24 and 25 for engagement with the slots 26 and 27 in the weights. 36 is a block adjustable longitudinally of the shaft 4 and having openings 37 and 38 respectively at diametrically opposite sides thereof receiving the springs 18 and 19, and 39 and 40 respectivly are adjusting screws carried by the block for engagement with the shaft 4 to retain the block in adjusted position. 41 is a ring keyed to the shaft 4 between the casting 15 and weights; 42 is a ring concentric with and rotatable relative to the ring 41; 43 are ball bearings between said rings; 44 and 45 respectively are arms projecting laterally from the ring 42 at diametrically opposite points thereof; 46 and 47 respectively are pins projecting from sockets 48 and 49 respectively in the rear ends of the weights beside the slots 26 and 27; 50 is a link terminally connected to the arm 44 and pin 47, and 51 is a link terminally connected to the arm 45 and pin 46.

Thus from the foregoing it will be apparent that the weighted ends of the springs 18 and 19 are movable laterally relative to the shaft 4, and that the pins 24 and 25 respectively serve to guide the same. The rings 41 and 42, arms 44 and 45, pins 46 and 47 and links 50 and 51 serve to equalize the movements of the said ends of the springs, while the adjustment of the block 36 longitudinally of the shaft 4 regulates the tension of the springs.

In use when the motor is in operation the propeller shaft 4 will be rotated as a result of the impulses imparted thereto from the pistons. Seemingly the rotation is constant but actually it is not for there are periods between impulses even though minute. Consequently at the time of the maximum impulses, i. e., when the explosions take place in the cylinders, the rotation of the shaft 4 is such as to cause the weights 22 and 23 to move outwardly by centrifugal action and to thereby place the springs 18 and 19 under tension and between impulses to be moved inwardly by the centripetal action of the springs towards the shaft. As a result the outward movement of the weights tends to retard the rotation thereof and to shunt or temporarily store the energy heretofore lost by the instantaneous transmission thereof to the tires, while the inward movement of the weights tends to accelerate the rotation of the shaft and at the same time to release or return the stored or shunted energy. Consequently the thrust to the tires is checked and made more constant. In fact, the following advantages are obtained:

1. Steadier and more prolonged application of driving force by introducing the factor of time in its delivery.

2. To conserve energy by storing in springs the excess of power, over the amount the tire is capable instantly of absorbing, to be delivered between impulses by acceleration or centripetal action.

3. To conserve energy by reducing the jerking or twitching of the tire by the power impulse.

4. Tire economy by maintaining contact between gear tooth faces, reducing reaction of tire after deformation by power impulse.

5. Improved traction by increasing stability of tire walls and tread.

6. Improved traction by maintaining more constant contact area with the road.

7. Prevention of undue wear of driving pinion and ring gear by maintaining contact between power impulses.

8. Synchronize action and reaction of tire walls and tread with power impulses.

9. Prevention of repercussion of gear tooth faces by reaction of tire from deformation by power impulses.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A motor vehicle drive mechanism including a rotatable shaft, and means tending to shunt energy imparted to the shaft whereby the thrust to the tires of the vehicle will be checked and made more constant, including springs carried by the shaft at diametrically opposite sides thereof, weights carried by said springs, and means adjustable longitudinally of the shaft to regulate the tension of said springs.

2. A motor vehicle drive mechanism including a rotatable shaft, and means tending to shunt energy imparted to the shaft whereby the thrust to the tires of the vehicle will be checked and made more constant, including weights upon diametrically opposite sides of said shaft and movable outwardly relative thereto by centrifugal action, springs terminally secured to said shaft and weights and adapted to move the latter centripetally relative to the shaft, and means associated with said shaft and weights to equalize the movements of said weights relative to said shaft.

3. A motor vehicle drive mechanism including a rotatable shaft, and means tending to shunt energy imparted to the shaft whereby the thrust to the tires of the vehicle will be checked and made more constant, including weights upon diametrically opposite sides of said shaft and movable outwardly relative thereto by centrifugal action, springs terminally secured to said shaft and weights and adapted to move the latter centripetally relative to the shaft, and means associated with the shaft for guiding the inward and outward movements of said weights.

4. A motor vehicle drive mechanism including a propeller shaft, castings fixed to and spaced longitudinally of said shaft, one of said castings being provided at diametrically opposite points thereof with sockets, the other of said castings being provided at diametrically opposite points thereof with radially extending arms, and means tending to shunt energy imparted to said shaft whereby the thrust to the tires of the vehicle will be checked and made more constant including leaf springs at diametrically opposite sides and extending longitudinally of said shaft, the forward ends of said springs being secured in the sockets in the first mentioned casting, the rear ends of said springs terminating short of the other casting and free to move laterally relative to said shaft, weights upon the outer sides of and rigid with said springs at the free ends thereof, means for guiding the lateral movement of the free ends of the springs including pins projecting from the radially extending arms on the second mentioned casting and engaging slots in said weights, and means for equalizing the lateral movements of the free ends of the springs including concentric rings surrounding the shaft between the free ends of the springs and the second mentioned casting, one of said rings being fixed to the shaft, anti-friction elements between said rings, arms projecting from the other of said rings at diametrically opposite points thereof, pins projecting from said weights, and links terminally connected to said last mentioned pins and arms.

5. A motor vehicle drive mechanism including a propeller shaft, castings fixed to and spaced longitudinally of said shaft, and means tending to shunt energy imparted to the shaft whereby the thrust to the tires of the vehicle will be checked and made more constant including leaf springs at diametrically opposite sides and extending longitudinally of said shaft, the forward ends of said springs being secured to one of the castings aforesaid, the rear ends of said springs terminating short of the other of said castings and free to move laterally relative to said shaft, weights rigid with said springs at the free ends thereof, means for guiding the lateral movements of the free ends of said springs including pins projecting from the other of said castings and engaging slots in said weights, and means for equalizing the lateral movements of the free ends of the springs, including means associated with the shaft and weights between the free ends of the springs and the last mentioned casting.

6. A motor vehicle drive mechanism including a propeller shaft, members fixed to and spaced longitudinally of said shaft, means tending to shunt energy imparted to the shaft whereby the thrust to the tires of the vehicle will be checked and made more constant including leaf springs at diametrically opposite sides and extending longitudinally of said shaft, the forward ends of said springs being secured to one of said members, the rear ends of said springs terminating short of the other of said members and free to move laterally relative to said shaft, weights fixed to said springs at the free ends thereof, means associated with the other of said members for guiding the lateral movement of the free ends of the springs, and means associated with the shaft and weights for equalizing the lateral movements of the free ends of said springs.

7. A motor vehicle drive mechanism including a propeller shaft, members fixed to and spaced longitudinally of said shaft, leaf springs at diametrically opposite sides and extending longitudinally of said shaft, the forward ends of said springs being secured to one of said members, the rear ends of said springs terminating short of the other of said members and free to move laterally relative to said shaft, weights carried by said springs at the free ends thereof, and means associated with said shaft and weights for equalizing the lateral movements of the free ends of said springs.

8. A motor vehicle drive mechanism including a propeller shaft, members fixed to and spaced longitudinally of said shaft, means tending to shunt energy imparted to said shaft whereby the thrust to the tires of the vehicle will be checked and made more constant including leaf springs at diametrically opposite sides and extending longitudinally of said shaft, the forward ends of said springs being secured to one of said members, the rear ends of said springs terminating short of the other of said members and free to move laterally relative to said shaft, weights carried by said springs at the free ends thereof, means associated with said shaft and adjustable longitudinally thereof for varying the tension of said springs, and means associated with said shaft and weights for equalizing the lateral movements of the free ends of said springs.

9. A motor vehicle drive mechanism including a propeller shaft, members fixed to and spaced longitudinally of said shaft, means tending to shunt energy imparted to said shaft whereby the thrust to the tires of the vehicle will be checked and made more constant including leaf springs at diametrically opposite sides and extending longitudinally of said shaft, the forward ends of said springs being secured to one of said members, the rear ends of said springs terminating short of the other of said members and free to move laterally relative to said shaft, weights carried by said springs at the free ends thereof, means associated with said shaft and adjustable longitudinally thereof for varying the tension of said springs, and means associated with said last mentioned member and weights for guiding the lateral movements of the free ends of said springs.

ALEXANDER S. DIACK.